United States Patent
Chamberlain et al.

(10) Patent No.: US 10,414,142 B2
(45) Date of Patent: *Sep. 17, 2019

(54) NEEDLE PUNCHING OF COMPOSITES FOR PREFORM ASSEMBLY AND THERMOMECHANICAL ENHANCEMENT

(71) Applicant: Rolls-Royce Corporation, Indianapolis, IN (US)

(72) Inventors: Adam L. Chamberlain, Mooresville, IN (US); Andrew J. Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 441 days.

This patent is subject to a terminal disclaimer.

(21) Appl. No.: 14/980,988

(22) Filed: Dec. 28, 2015

(65) Prior Publication Data

US 2016/0185092 A1 Jun. 30, 2016

Related U.S. Application Data

(60) Provisional application No. 62/097,340, filed on Dec. 29, 2014.

(51) Int. Cl.
*B32B 37/00* (2006.01)
*B32B 37/06* (2006.01)
(Continued)

(52) U.S. Cl.
CPC ............. *B32B 37/06* (2013.01); *B29B 11/16* (2013.01); *B29C 65/564* (2013.01);
(Continued)

(58) Field of Classification Search
CPC ..... B32B 37/06; B32B 37/0015; B32B 37/02; B29C 11/16; B29C 65/564;
(Continued)

(56) References Cited

U.S. PATENT DOCUMENTS 2,036,766 A 4/1936 McDermott
3,090,099 A 5/1963 Smith, II
(Continued)

OTHER PUBLICATIONS

M.G. Kamath, Atul Dahiya, Raghavendra R Hegde (Praveen Jana & Xinli Liu), Needle Punched Nonwovens, http://www.engr.utk.edu/mse/textiles/needle punched nonwovens.htm, Apr. 2004, 8 pages.
(Continued)

*Primary Examiner* — James D Sells
(74) *Attorney, Agent, or Firm* — Barnes & Thornburg LLP

(57) ABSTRACT

A method of forming a composite preform containing multiple laminates is disclosed. The method may include providing a first sublaminate comprising stacked fibers woven into a fabric; providing a second sublaminate comprising stacked fibers woven into a fabric; joining the first sublaminate and the second sublaminate forming a component comprising a region of discontinuity sandwiched between the first sublaminate and the second sublaminate; rigidizing the component; and softening the region between the first sublaminate and the second sublaminate. In illustrative embodiments, the method may include manipulating the region of discontinuity between the first sublaminate and the second sublaminate to reduce the incoherence between the sublaminates by moving fibers from the sublaminates through at least part of the region between the first sublaminate and the second sublaminate.

19 Claims, 5 Drawing Sheets

(51) Int. Cl.
   B29C 70/02    (2006.01)
   B32B 37/02    (2006.01)
   B29C 70/24    (2006.01)
   B29B 11/16    (2006.01)
   B29C 65/56    (2006.01)
   B29C 65/00    (2006.01)
   B32B 38/04    (2006.01)
   B29C 65/18    (2006.01)
   B29C 65/32    (2006.01)
(52) U.S. Cl.
   CPC ........ B29C 66/026 (2013.01); B29C 66/0242 (2013.01); B29C 66/1122 (2013.01); B29C 66/21 (2013.01); B29C 66/43441 (2013.01); B29C 66/721 (2013.01); B29C 70/02 (2013.01); B29C 70/24 (2013.01); B32B 37/0015 (2013.01); B32B 37/02 (2013.01); B29C 65/18 (2013.01); B29C 65/32 (2013.01); B29C 66/7212 (2013.01); B32B 2038/042 (2013.01); B32B 2305/188 (2013.01)
(58) Field of Classification Search
   CPC ............. B29C 66/0242; B29C 66/026; B29C 66/1122; B29C 66/21; B29C 66/43441; B29C 66/721; B29C 70/02; B29C 70/24
   USPC ........................................................ 156/73.1
   See application file for complete search history.

(56) References Cited

U.S. PATENT DOCUMENTS

| | | | |
|---|---|---|---|
| 3,538,564 A | 11/1970 | Skoler et al. | |
| 3,994,762 A | 11/1976 | Wrzesien et al. | |
| 4,258,093 A | 3/1981 | Benedyk | |
| 4,983,451 A | 1/1991 | Sugino et al. | |
| 5,071,700 A | 12/1991 | Sugino et al. | |
| 5,160,471 A | 11/1992 | Vives et al. | |
| 5,490,602 A * | 2/1996 | Wilson | B29C 70/22 216/56 |
| 5,490,892 A | 2/1996 | Castagnos et al. | |
| 5,503,254 A | 4/1996 | Fisher et al. | |
| 5,980,669 A | 11/1999 | Maumus et al. | |
| 6,221,475 B1 | 4/2001 | Domergue et al. | |
| 6,361,722 B1 | 3/2002 | Theys et al. | |
| 6,995,099 B1 * | 2/2006 | Nishimura | B29C 70/083 442/59 |
| 7,001,544 B2 | 2/2006 | Shin et al. | |
| 7,052,632 B2 | 5/2006 | Lavasserie et al. | |
| 7,200,912 B2 | 4/2007 | Bouillon et al. | |
| 2004/0247845 A1 | 12/2004 | Abe et al. | |
| 2008/0206540 A1 | 8/2008 | Sanial et al. | |
| 2010/0084075 A1 | 4/2010 | Rutten et al. | |
| 2012/0034089 A1 | 2/2012 | Wadewitz et al. | |

OTHER PUBLICATIONS

Shangwu Fan, Litong Zhang, Yongdong Xu, Laifei Cheng, Jianjun Lou, Junzhan Zhang, Lin Yu, Microstructure and Properties of 3D Needle Punched Carbon/Silicon Carbide Brake Materials, Science Direct, Jan. 30, 2007, 9 pages.

Jae Yeol Lee, Tae Jin Kang, Joon-Hyung Byun, Architectural Design of Preforms and Their Effects on Mechanical Property of High Temperature Composites, Mechanical Properties and Performance of Engineering Ceramics and Composites III, The American Ceramic Society, 2008, 8 pages.

* cited by examiner

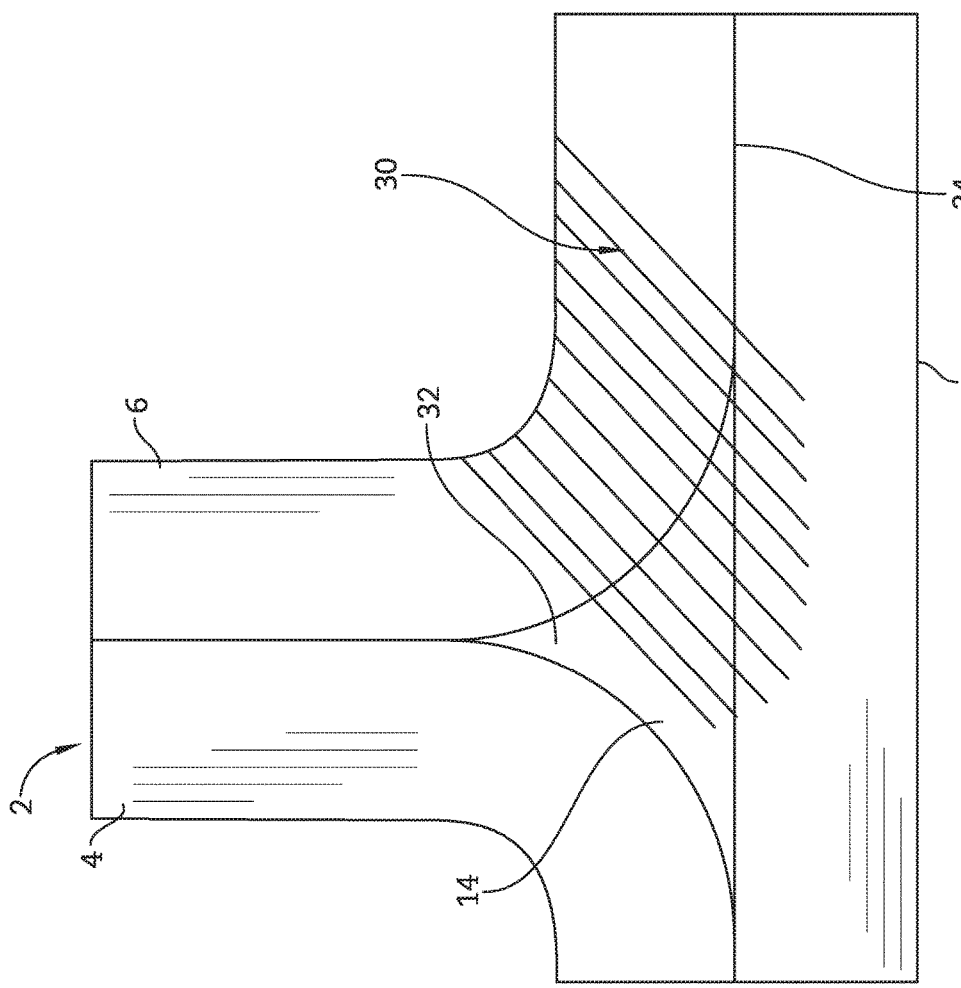

NEEDLE PUNCHING OF COMPOSITES FOR PREFORM ASSEMBLY AND THERMOMECHANICAL ENHANCEMENT

CROSS REFERENCE TO RELATED APPLICATIONS

This application claims priority to and the benefit of U.S. Provisional Patent Application No. 62/097,340, filed 29 Dec. 2014, the disclosure of which is now expressly incorporated herein by reference.

TECHNICAL FIELD

The present disclosure relates to needle punching composites for preform assembly and thermomechanical enhancement, and in particular, to consolidating a preform using needle punching to remove discontinuities.

BACKGROUND

Economic and environmental concerns, i.e. improving efficiency and reducing emissions, are driving forces behind the ever increasing demand for higher gas turbine inlet temperatures. Designers of gas turbine engines recognize that a limitation to the efficiency and emissions of many gas turbine engines is the temperature capability of hot section components included in gas turbine inlets (examples include, but are not limited to blades, vanes, blade tracks, and combustor liners). Technology improvements in cooling, materials, and coatings are required to achieve higher inlet temperatures. As the temperature capability of Ni-based superalloys approach their intrinsic limit, further improvements in their temperature capability become increasingly difficult. Therefore, the emphasis in gas turbine materials development has shifted to thermal barrier coatings (TBC) and next generation high temperature materials, such as ceramic-based materials.

Ceramic matrix composites—sometimes referred to as CMCs are candidates to replace Ni-based superalloys for hot section structural components for next generation gas turbine engines. The key benefit to CMC engine components is their excellent high temperature mechanical, physical and chemical properties. This allows gas turbine engines to operate at much higher temperatures than the engines having metallic superalloy components. CMCs can provide the additional benefit of damage tolerance, which monolithic ceramics do not possess. That said, current two-dimensional (2D) preforming techniques for CMCs may limit shape complexity and impact mechanical performance by introducing material discontinuities.

SUMMARY

The present disclosure offers a solution to current limitations of 2D preforming. This process allows for increased complexity by removing/reducing material discontinuities created by multiple piece preform constructions. The process may also be used to locally tailor mechanical and thermal properties of a laminate by introducing through-thickness fiber reinforcement into a preform that maintains desired fiber volume levels.

The present disclosure provides a process for consolidating a polymeric preform containing ceramic or carbon fibers using a needle punching approach that softens the polymer to allow for insertion of the needles.

In one embodiment, a method of forming a composite preform containing multiple laminates may comprise providing a first sublaminate comprising stacked SiC—SiC fibers woven into a fabric; providing a second sublaminate comprising stacked SiC—SiC fibers woven into a fabric; joining the first sublaminate and the second sublaminate forming a component comprising a region of discontinuity sandwiched between the first sublaminate and the second sublaminate; rigidizing the component; softening the region between the first sublaminate and the second sublaminate; and manipulating the region of discontinuity between the first sublaminate and the second sublaminate to reduce the incoherence between the sublaminates by moving SiC—SiC fibers from the sublaminates through at least part of the region.

Manipulating the region of discontinuity may be performed by needle punching, directed needle punching, ultrasonic, snares, directed water jets, barb punching, a comb, or some combination thereof.

The method may further comprise providing an insert in the region of discontinuity between the first sublaminate and the second sublaminate to at least partially fill the region between the first sublaminate and the second sublaminate.

In some embodiments, the insert may comprise a fiber, chopped fibers, a ceramic green body, a noodle, or some combination thereof. The insert may be manipulated through one of by needle punching, directed needle punching, ultrasonic, snares, directed water jets, barb punching, a comb, or some combination thereof.

In some embodiments, rigidizing may be performed with a thermal plastic, a water soluble polymer, a polyvinyl alcohol, or a combination thereof. In some embodiments, the softening may be performed by applying heat to the needle, the region, or some combination thereof. The softening may performed by applying solvent or water vapor to the polyvinyl alcohol. In some embodiments, softening may comprise: (a) applying resistively heated thermal tape to a backside of a needle punch head unit thereby heating needles of the needle punch head unit by conduction; (b) induction heating the needle-punch head unit, which causes heating of the head unit by conduction; (c) attaching lead wires to the needles in order to supply amperage from an external power supply; (d) supplying water vapor or liquid through the needles; or (f) heating the needles and the first and second sublaminates by a method selected from the group consisting of ultrasonically exciting, microwave, laser, and oven. In some embodiments, the heating may comprise induction, resistance, or radiation.

In another aspect of the present invention a method of fabricating a multiple laminate composite part is taught. The method may comprise fabricating a plurality of sublaminates; forming the plurality of sublaminates into a laminate; rigidizing the laminates using a thermoplastic or solvent soluble polymer; assembling the plurality of laminates into the multiple laminate composite part; and needle punching at least one laminate of the plurality of laminates of the multiple laminate composite part to remove discontinuities between the plurality of laminates of the multiple laminate composite part.

In some embodiments, the needle punching may comprise needle punching by a plurality of barbed needles. The barbed needles may be made of steel and may be coated with a ceramic coating selected from the group consisting of silicon carbide, silicon nitride, titanium nitride and diamond-like carbon. In some embodiments, at least one laminate of the plurality of laminates may include a polymer binder to stabilize surrounding material to reduce distortion and act as a lubricant.

An illustrative embodiment of the present disclosure provides a method of fabricating a multiple laminate composite. The method comprises providing first and second sublaminates, wherein the first and second sublaminates are fabricated to a final thickness; molding the first and second sublaminates into individual shapes by infiltrating them with a thermoplastic or solvent soluble polymer; assembling the first and second sublaminates into a final shape by applying heat in order to soften the thermoplastic or by introducing water vapor to soften a solvent soluble polymer, wherein at least one discontinuity is formed between the first and second sublaminates; drying the first and second sublaminates; applying pressure to the first and second sublaminates to ensure final dimensional conformity and reduce any gap between the sublaminates; and needle punching the first and second sublaminates thereby removing the at least one discontinuity wherein a plurality of needles are inserted traversing across a boundary between the first and second sublaminates.

In some embodiments, the method may further comprise providing an insert fabricated from plies of a fabric to fill a space between the first and second sublaminates.

In some embodiments, the method may further comprise tooling the first and second sublaminates in locations in which a head unit may not make contact. The tooling may comprise applying an external clamping force in order to maintain dimensional conformance during needle punching. The needle punching may comprise using a needle punching head unit set with a plurality of needles to create a desired surface area coverage to reinforce the first and second preform parts.

The present disclosure provides a gas turbine engine component manufacturing by any one of the preceding methods.

BRIEF DESCRIPTION OF DRAWINGS

The present disclosure will be described hereafter with reference to the attached drawings which are given as a non-limiting example only, in which:

FIG. 5 is an end detail view of the part of FIG. 2 showing fiber reinforcements inserted into pin holes while reinforcing the part of FIG. 2.

Figure 1:
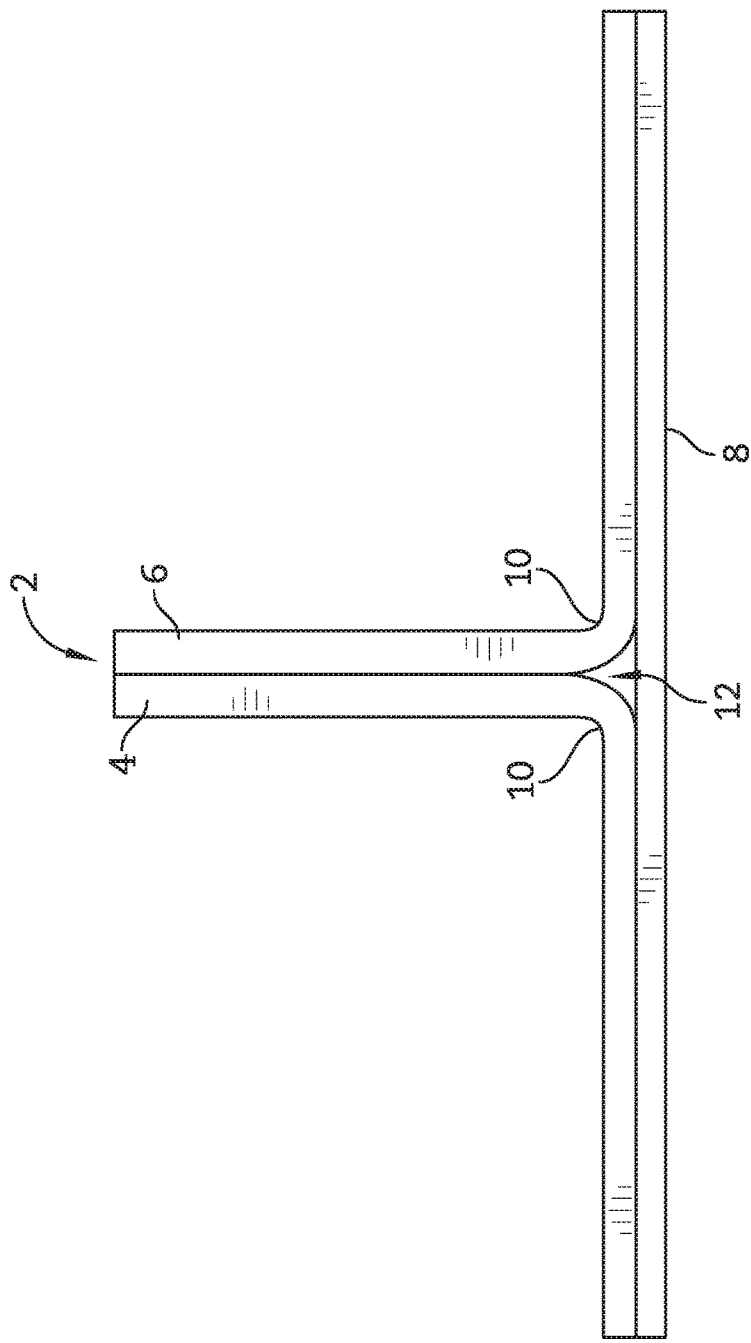
FIG. 1 is an end view of an illustrative part showing a plurality of laminates and an insert with discontinuities that cooperate to form an illustrative T-shaped part.

The exemplification set out herein illustrates embodiments of the methods and such exemplification is not to be construed as limiting the scope of the methods in any manner.

DETAILED DESCRIPTION

For the purposes of promoting an understanding of the principles of the disclosure, reference will now be made to a number of illustrative embodiments illustrated in the drawings and specific language will be used to describe the same.

A process for forming a sublaminate may begin with the fabrication of a two-dimensional or three-dimensional inorganic fiber preform, which may form a structural scaffold for subsequent incorporation of a ceramic matrix. To make the sublaminate, chopped fibers, continuous fibers, woven fabrics, 3D woven preforms or combinations thereof are laid up, formed, fixed and shaped into the configuration of a desired component. The fibers in the inorganic fiber preform may be made from any inorganic material that is stable at processing temperatures above about 1000° C. and is compatible with the temperature of the molten alloy infiltrant. Suitable examples include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, pre-ceramic SiC fibers such as those available under the trade designation HI-NICALON and SYLRAMIC from COI Ceramics, Inc., San Diego, Calif.

In an illustrative embodiment, the process uses a modular preforming approach that fabricates multiple laminates that are rigidized using a thermoplastic (e.g., wax) or solvent soluble polymer (e.g., polyvinyl alcohol/water). The individual laminates are then processed using 2D fabrication approaches. After the individual sublaminates are assembled the discontinuities may be removed by manipulating the fibers of the sublaminates. Manipulating the fibers may be performed by needle punching, directed needle punching, ultrasonic, snares, directed water jets, barb punching, a comb, or some combination thereof. Manipulating the fibers may include pulling or pushing a fiber from one sublaminate through the region of discontinuity to reduce the variance between the sublaminates. The fibers may be pulled or pushed through the region of discontinuity such that the fibers may run in the through thickness direction of the part. Needle punching may also be employed on single-piece polymer filled preforms to locally or uniformly increase interlaminar and through thickness properties.

Discontinuous fibers may also be placed or laminated on the preform surface specifically to be drawn through the preform by barbs. This results in an increased interlaminar tensile/shear strength and reduced probability of delaminations. The proposed process could be used on carbon, an oxide, and carbide based ceramic fiber preforms.

The needle punch device locally softens the polymer adding heat, an appropriate solvent liquid, or vapor (water for PVA, mineral spirits for wax). An alternative method may involve restraint of the entire preform with a provision for needle passage via holes, a grid, or other means so that needle punching may be conducted in an environment that substantially softens the polymer (high temperature or solvent vapor). As barbed needles pass through the preform, fibers are broken and inserted through thickness and across the layers of discontinuity. Needles for textile punching are typically steel. Illustratively, it may be advantageous to coat these needles with a material that has higher wear resistance and improved capability with the fibers and matrix for all processing and operating conditions. Ceramic coatings like silicon carbide, silicon nitride, titanium nitride, or diamond-like carbon are some potential options.

An end view of a preform part 2 is shown in FIG. 1. Preform 2 is formed by multiple sublaminates 4, 6, and 8. Also shown is a region of discontinuity 12 located opposite radius area 10. The region of discontinuity 12 occurs at individual preform boundaries, the triangular insert 14, or some combination thereof. The region of discontinuity 12 may be a region between two sublaminates wherein there is a void between the sublaminates such that there is a space relatively free from fibers between the sublaminates. The region of discontinuity 12 may also be a region including some fibers, i.e. chopped fibers, an insert, a noodle or the like which may be dissimilar from the sublaminates. The region of discontinuity 12 may be dissimilar from the sublaminates such that interlaminer strength may be less in the region of discontinuity 12 than in the sublaminates. By reducing the region of discontinuity 12, the interlaminar strength of the preform part 2 may be improved.

Figure 2:
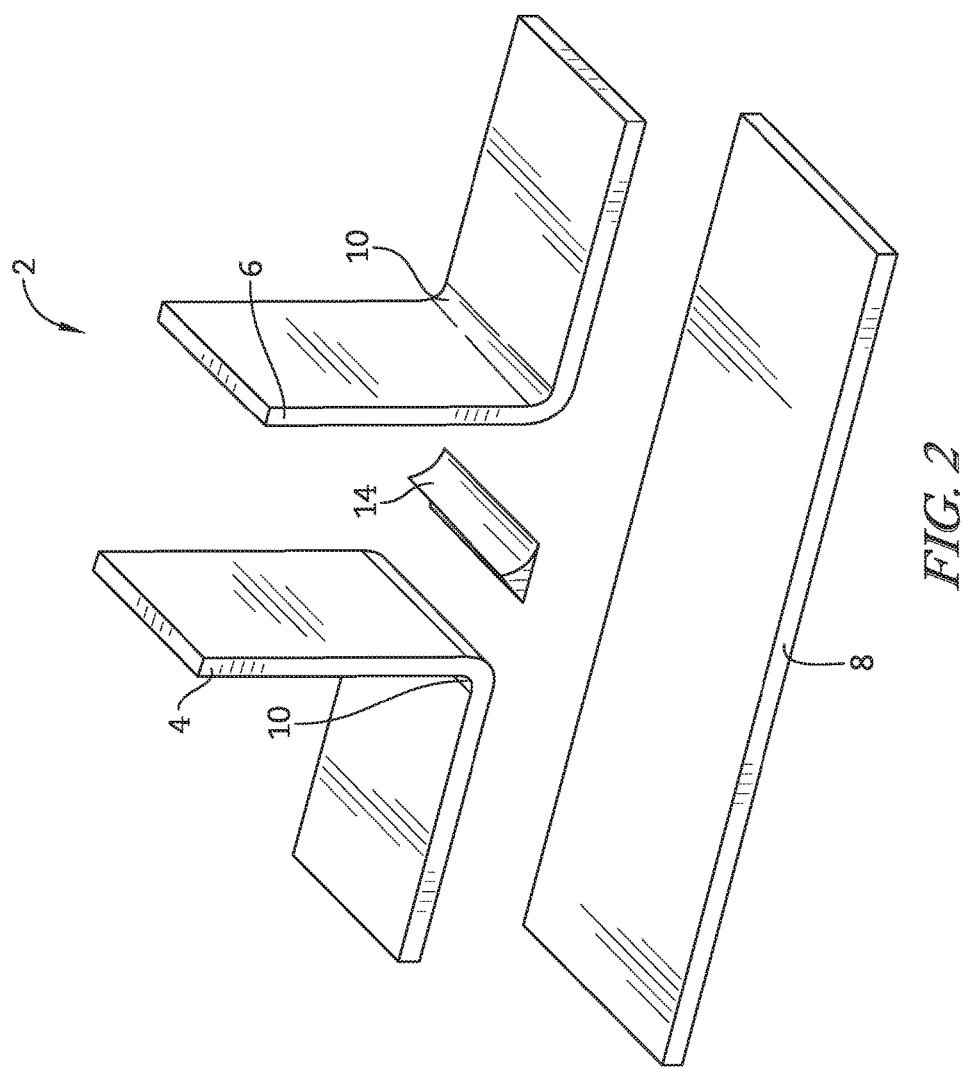
FIG. 2 is an exploded view of the individual components that make up the illustrative T-shaped part.

An exploded view of preform 2 with its individual laminates 4, 6, and 8 spaced apart is shown in FIG. 2. A preform may be an unrigidized CMC component, which may not have been infiltrated with silicon carbide material to create a ceramic matrix.

Figure 3:
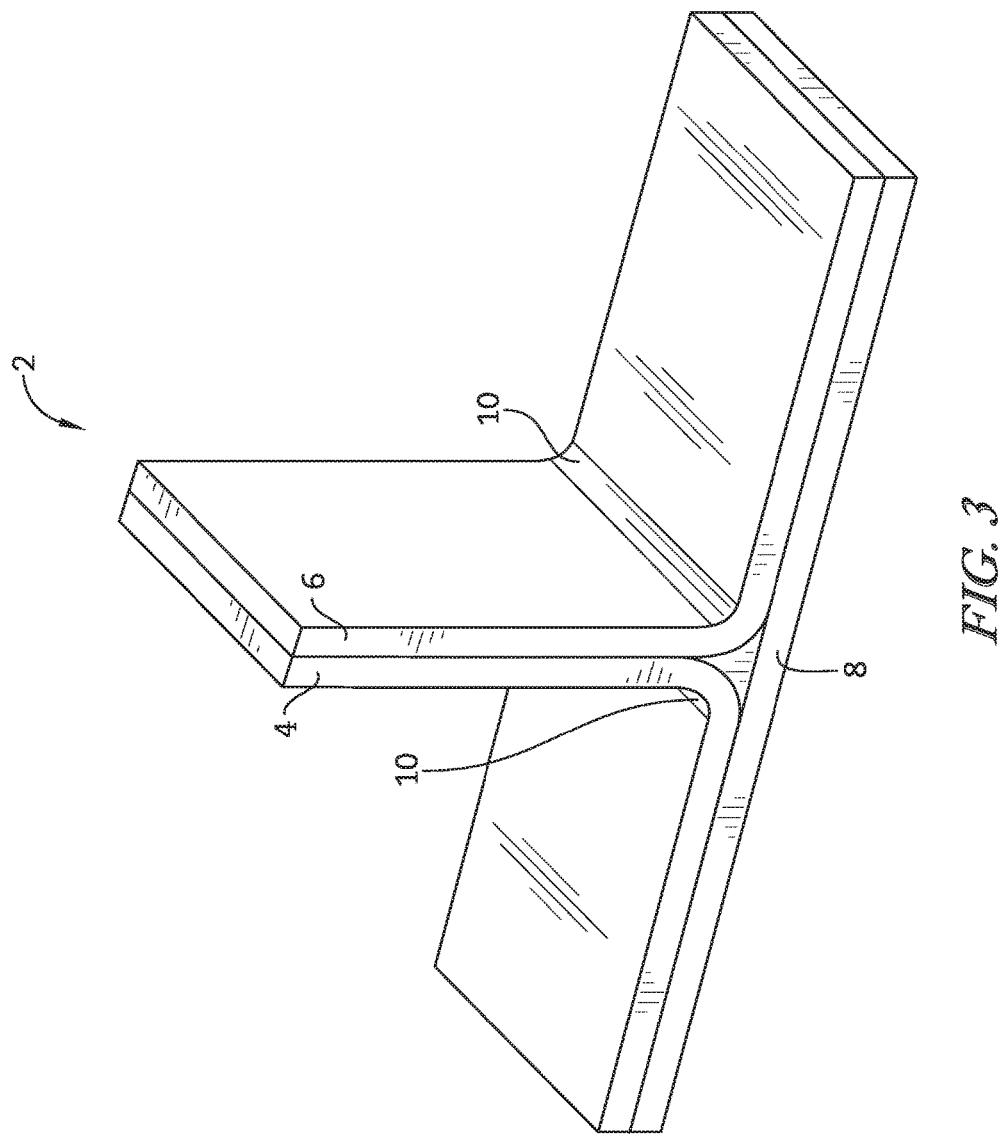
FIG. 3 is a perspective view of an assembled part from FIG. 2.

An insert 14 is illustratively employed to fill the empty space between laminates 4, 6, and 8. The insert may be a noodle, a fiber, chopped fibers, or some combination thereof. A noodle may refer to a an individual fiber or a bundle of fibers woven together. After polymer consolidation, preform 2 becomes a unitary structure, as shown in FIG. 3. Preform 2 is illustratively a simple T-shaped structure to assist in describing the process. This shape simulates a transition region from a blade platform to airfoil, blade airfoil to blade shroud, or a vane airfoil to endwall for use in aircraft engines.

Figure 4:
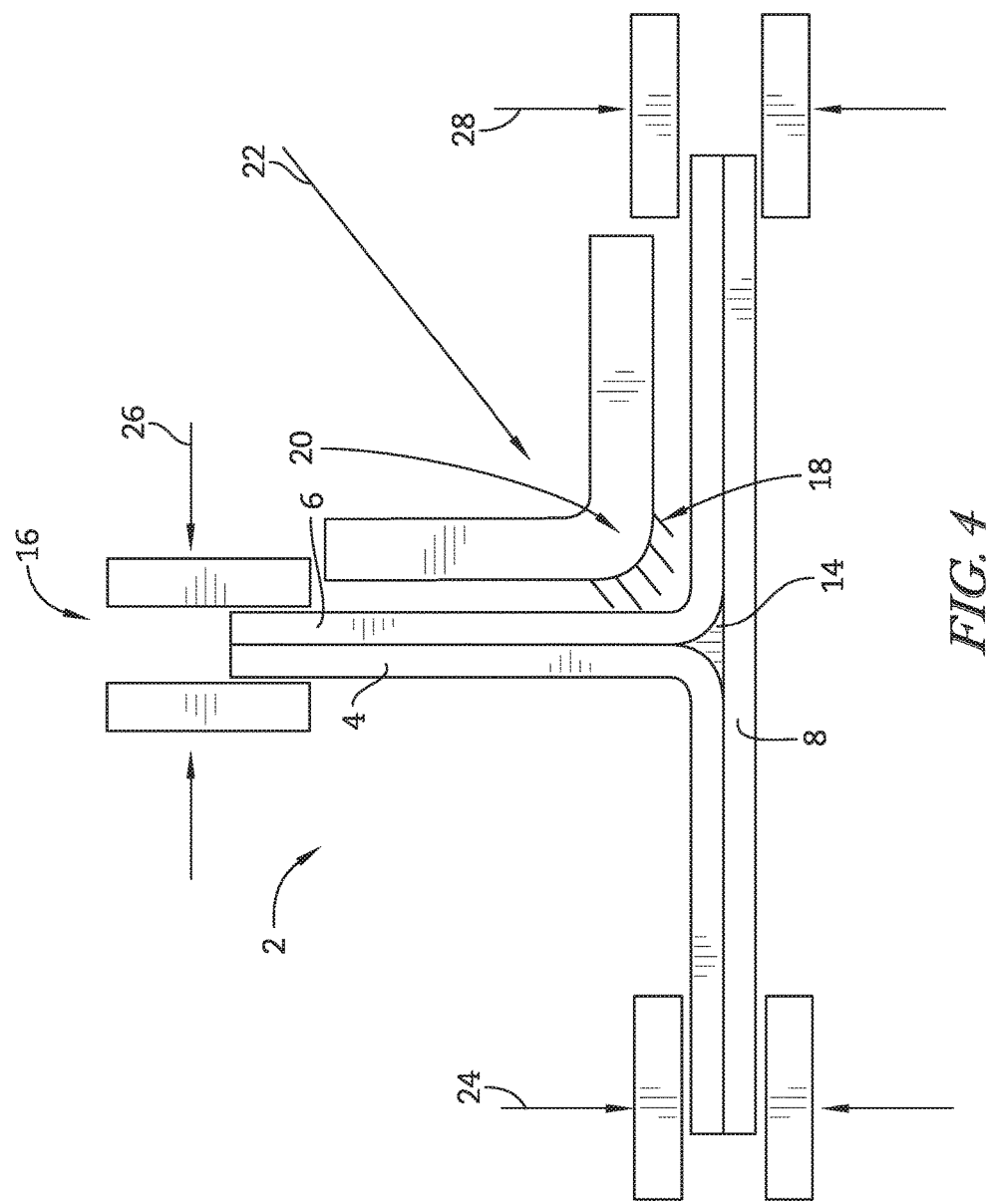
FIG. 4 is a schematic view of a needle punch process applied to the part of FIGS. 1-3.

A simplified schematic view of a needle-punch tool 16 is shown in FIG. 4. It is appreciated that additional tools may be introduced to the left side of the illustrative L shape and under the bottom plate, for example. Needles 18 in the schematic are only displayed on the fillet area of the head unit 20 for demonstrative purposes. It is further appreciated that needles 18 may traverse the entire surface area of the head unit 20. Also shown in this view is the direction of movement 22 of head unit 20, so needles 18 pierce preform 2. Clamps 24, 26, and 28 hold preform 2 in place. It is appreciated that clamps 24, 26, may be reconfigured based on the size and shape of the preform. The shape and size of preform 2 is illustrative only.

A side detail view of preform 2 having ceramic fiber reinforcements 30 disposed in laminates 6 and 8, and insert 15 is shown in FIG. 5. In this illustrative embodiment, Fibers traverse across individual preform boundaries 32 and 34.

Fabricating a preform, such as preform 2 according to the present disclosure is performed according to the following steps:

A plurality of individual preforms are fabricated based on the shape of the desired structures. In the example of preform 2, the individual preforms include two illustratively L-shape laminates, a bottom plate, and one triangular insert (see FIG. 2). The two illustratively L-shapes and the bottom plate may be fabricated using multiple single layers of fabric or by the fabrication of a single, multi-ply fabric with a desired final thickness. The creation of a multi-ply fabric for each preform may require a through thickness fiber reinforcement illustratively introduced by three-dimensional (3D) weaving or by needle punching of the dry fabric. The illustrative triangular insert may be fabricated from plies of fabric, a 3D section, concentric braids, uni-axial tow, or from a discontinuous fiber mat.

The individual fabrics are then molded into the illustratively L-shapes, bottom plate, and triangular insert by infiltrating them with a thermoplastic or solvent soluble polymer. Illustratively, the shapes are molded in metallic tooling that conforms to the individual shapes.

After the individual shapes are formed, the parts are consolidated into the final shape by an assembling them into a tool that conforms to the overall final illustrative T-shape. Heat is applied in order to flow the thermoplastic. Alternatively, water vapor is introduced to soften the solvent soluble polymer and then dried. During consolidation, pressure may also be applied to the tool in order to ensure final dimensional conformity and reduce gaps between individual preforms.

After consolidation, the part is removed conforming to the final shape (see FIG. 3). At this stage, the part contains areas of material discontinuity.

The consolidated part is then needle punched in order to remove areas of material discontinuity (see FIGS. 4 and 5).

During the punching operation, the part may be tooled in areas in which head unit 20 will not make contact. The tooling may apply an external clamping force in order to maintain dimensional conformance during the operation. Once the tooling is in place, the part goes through the punching process.

The needle punching head unit 20 is set with the desired number of needles for the desired reinforcement and for the desired surface area coverage. As shown in FIG. 4 the reinforcement is applied to only the right side illustrative L-shape for illustrative purposes only. It is appreciated that the entire surface area of the part may be needle punched if needed. The length of the needles used in the operation will depend on the desired depth of penetration.

The needle-punch then penetrates the polymeric fiber preform by the introduction of heat or water vapor in order to locally soften the preform. It may be advantageous to maintain an environment that makes the binder easier to soften. This may be accomplished by maintaining the temperature slightly below the polymer melting temperature and/or maintaining a high vapor pressure of water or solvent. The introduction of heat or solvent/water vapor could occur by the following: (a) Application of resistively heated thermal tape to the backside of the head unit to heat the head unit thereby heating the needles by conduction; (b) Induction heating the head unit to heat the head unit by conduction; (c) Attaching lead wires directly to the needles in order to supply amperage from an external power supply if the needles are fabricated from a common heater coil material (e.g., Nichrome); (d) Water vapor (or liquid) may be supplied directly through the needles if the needles have a hollow cavity through which water may pass under pressure and atomized in order to create a fine mist; (e) The approach described in "d" may be achieved by introducing small holes directly into the head unit to allow for solid needles and reduce the complexity of needle manufacturing (the head unit may contain holes only in the desired area); (f) Ultrasonic excitation of the needle-punch head, the part or both resulting in friction and related heating of the needle and the binder; (g) Microwave heating the head unit causing the head unit to heat by conduction; (h) Laser heating the needles or local heating the preform/binder; or (i) Heating the needle assembly in an oven and using thermal mass to maintain sufficient temperature.

Once the softening source is selected, the head unit is positioned in order to insert the needles in the proper location, angle, quantity, etc. The rate of needle penetration is balanced by the rate of softening. During needle penetration, the rate, depth, and force could be monitored by instrumentation on the head unit.

Once the needles travel the desired distance, head unit 20 is retracted. During the retraction, polymeric softening may be maintained or reduced by decreasing the temperature or humidity.

Indexing the head unit and/or guide tools relative to the part allows for tailoring the needling density and enables the use of smaller needling heads to cover the entire area for reinforcement on a part.

Once needle punching is completed, the areas of discontinuity are removed/reduced by fibers traversing across the boundaries. As shown in FIG. 5, fibers moving across the boundary 32 between the right L shape 6 and the triangular insert 14, and boundary 34 between the right L shape 6 and bottom plate 8. Fibers traversing across occur anywhere in which this operation was performed.

The disclosed process may provide one or more of the following advantages: (1) Improved interlaminar tensile/shear strength at preform discontinuities; (2) Fabrication of assemblies from multiple preforms that can be easier to manufacture; (3) Large component fabrication; (4) Improved sealing between interfaces (e.g., vane to endwall sealing); (5) Reduction or removal of small inserts in areas in which 2D laminates will not occupy in normal forming operations; (6) Reduced cost when compared to the alternatives like 3D preforms; and (7) Local tailoring of properties as required by the design through variation in needle size or type, punching density, and depth.

Needle punching with a polymer binder in the preform may also be advantageous because the final component fiber volume may be maintained. Needling dry fabric materials typically results in lower total fiber volume than would be typical in a laminate. The polymer also stabilizes surrounding material and reduces/eliminates distortion that can be a challenge in dry fabric needling. Further, the polymer may act as a lubricant to reduce in-plane fiber breakage during the needling process. Compared to a dry needling process, this process may reduce the amount of fiber that is released into the air which is an EHS concern and an equipment durability challenge.

In some embodiments, the region may not be needle-punched as described herein. Alternatively the region of discontinuity 12 may be reduced by using a directed water jet, a comb including multiple needles or barbs, a snare, or a single barb. The method of reducing the region of discontinuity 12 may be directed such that the fiber may be manipulated, pushed, pulled, or some combination thereof in the through thickness of the preform. The process may be ultrasonically assisted.

The method may further comprise fabricating the first and second preform parts using multiple single layers of fabric or a single, multi-ply fabric with the final thickness. Additionally, the method may further comprise creating a multi-ply fabric for each of the first and second preform parts by creating a through thickness fiber reinforcement introduced by 3D weaving or by needle punching dry fabric. In some embodiments, the method may further comprise tooling the first and second preform parts in locations in which a head unit will not make contact. The tooling may comprise applying an external clamping force in order to maintain dimensional conformance during need punching.

Needle punching may comprise using a needle punching head unit set with a plurality of needles to create a desired surface area coverage to reinforce the first and second preform parts. In some embodiments, the entire surface area of the first and second preform parts may be needle punched. In some embodiments, the method may further comprise softening the first and second preform parts when needle punching the first and second preform parts.

In some embodiments, softening the first and second preform parts may comprise applying heat or solvent/water vapor to locally soften the first and second preform parts when needle punching the first and second preform parts. In some embodiments, the method may further comprise maintaining a temperature slightly below the polymer melting temperature or maintaining a high vapor pressure of the water/solvent vapor when needle punching the first and second preform parts.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of forming a composite preform containing multiple laminates, the method comprising
providing a first sublaminate comprising stacked SiC fibers woven into a fabric;
providing a second sublaminate comprising stacked SiC fibers woven into a fabric;
joining the first sublaminate and the second sublaminate forming a component comprising a region of discontinuity sandwiched between the first sublaminate and the second sublaminate;
rigidizing the component;
softening the region between the first sublaminate and the second sublaminate; and
manipulating the region of discontinuity between the first sublaminate and the second sublaminate to reduce the incoherence between the sublaminates by moving SiC fibers from the sublaminates through at least part of the region.

2. The method of claim 1, wherein manipulating the region of discontinuity is performed by needle punching, directed needle punching, ultrasonic, snares, directed water jets, barb punching, a comb, or some combination thereof.

3. The method of claim 1, further comprising providing an insert in the region of discontinuity between the first sublaminate and the second sublaminate to at least partially fill the region between the first sublaminate and the second sublaminate.

4. The method of claim 3, wherein the insert comprises a fiber, chopped fibers, a ceramic green body, a noodle, or some combination thereof.

5. The method of claim 4, wherein the insert is manipulated by needle punching, directed needle punching, ultrasonic, snares, directed water jets, barb punching, a comb, or some combination thereof.

6. The method of claim 1, wherein the rigidizing is performed with a thermal plastic, a water soluble polymer, a polyvinyl alcohol, or a combination thereof.

7. The method of claim 1, wherein the softening is performed by applying heat to the needle, the region, or some combination thereof.

8. The method of claim 7, wherein the softening is performed by applying solvent or water vapor to the polyvinyl alcohol.

9. The method of claim 7, wherein softening comprises:
(a) applying resistively heated thermal tape to a backside of a needle punch head unit thereby heating needles of the needle punch head unit by conduction;

(b) induction heating the needle-punch head unit, which causes heating of the head unit by conduction;
(c) attaching lead wires to the needles in order to supply amperage from an external power supply;
(d) supplying water vapor or liquid through the needles; or
(f) heating the needles and the first and second preform parts by a method selected from the group consisting of ultrasonically exciting, microwave, laser, and oven.

10. The method of claim 7, wherein the heating comprises induction, resistance, or radiation.

11. A method of fabricating a multiple laminate composite part, the method comprising:
fabricating a plurality of sublaminates;
forming the plurality of sublaminates into a laminate;
rigidizing the laminates using a thermoplastic or solvent soluble polymer;
assembling the plurality of laminates into the multiple laminate composite part; and
needle punching at least one laminate of the plurality of laminates of the multiple laminate composite part to remove discontinuities between the plurality of laminates of the multiple laminate composite part.

12. The method of claim 11, wherein needle punching comprises needle punching by a plurality of barbed needles.

13. The method of claim 12, wherein the barbed needles are made of steel and are coated with a ceramic coating selected from the group consisting of silicon carbide, silicon nitride, titanium nitride and diamond-like carbon.

14. The method of claim 11 wherein at least one laminate of the plurality of laminates includes a polymer binder to stabilize surrounding material to reduce distortion and act as a lubricant.

15. A method of fabricating a multiple laminate composite, the method comprising:
providing first and second sublaminates, wherein the first and second sublaminates are fabricated to a final thickness;
rigidizing the first and second sublaminates into individual shapes by infiltrating them with a thermoplastic or solvent soluble polymer,
assembling the first and second sublaminates into a final shape by applying heat in order to soften the thermoplastic or by introducing water vapor to soften a solvent soluble polymer, wherein at least one discontinuity is formed between the first and second sublaminates;
drying the first and second sublaminates;
applying pressure to the first and second sublaminates to ensure final dimensional conformity and reduce any gap between the first and second preform parts; and
needle punching the first and second sublaminates thereby removing the at least one discontinuity between the first and second sublaminates of the multiple laminate composite part wherein a plurality of needles are inserted traversing across a boundary between the first and second preform parts.

16. The method of claim 15, further comprising providing an insert fabricated from plies of a fabric to fill a space between the first and second sublaminates.

17. The method of claim 15, further comprising tooling the first and second preform parts in locations in which a head unit will not make contact.

18. The method of claim 17, wherein tooling comprises applying an external clamping force in order to maintain dimensional conformance during needle punching.

19. The method of claim 15, wherein needle punching comprises using a needle punching head unit set with a plurality of needles to create a desired surface area coverage to reinforce the first and second preform parts.

* * * * *